Nov. 27, 1962

A. ABRAMS 3,065,615

MATERIAL EXAMINING APPARATUS

Filed June 1, 1959

INVENTOR.
Abraham Abrams

BY S.C. Yuter

ATTORNEY

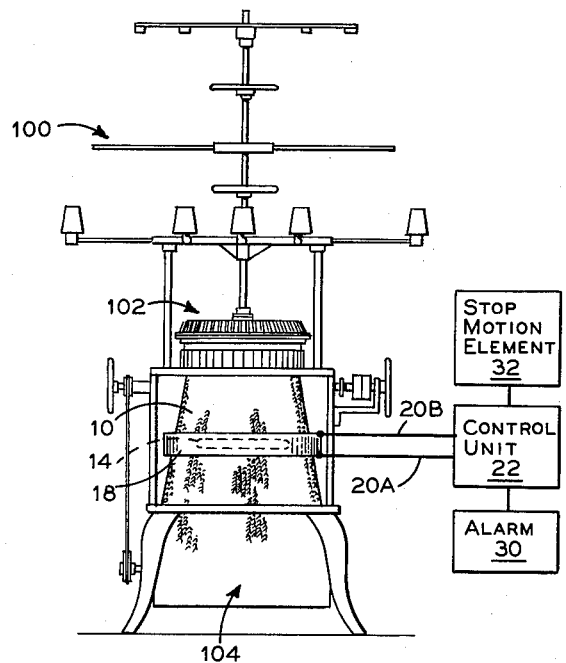

United States Patent Office 3,065,615
Patented Nov. 27, 1962

3,065,615
MATERIAL EXAMINING APPARATUS
Abraham Abrams, Roslyn Heights, N.Y.
(109 Marine St., Farmingdale, N.Y.)
Filed June 1, 1959, Ser. No. 817,181
12 Claims. (Cl. 66—166)

This invention relates to the sensing of the light transmission properties of materials and more particularly to the examining of knitted or woven fabrics by photoelectric means.

In general, the light transmission characteristics of materials are affected by the thickness of the material, the uniformity of the material, the variations in the transparency throughout the material, the presence or absence of holes, and the presence or absence of markings on a face of the surface. Generically, such characteristics will be termed as imperfections whether they occur accidentally or are deliberately incorporated in the material. In other words, an imperfection in the material is herein considered to be anything which will alter its light transmission characteristics from a predetermined standard or norm.

In any event, when the quantity of light transmitted through a semi-transparent or even opaque material increases from an expected quantity, i.e., a predetermined minimum for the semi-transparent material or no light for an opaque material, to a greater quantity of light it indicates that an opening or thin place is present in the material. It should be noted that the opposite phenomena is also possible. When a mark is present either accidentally or purposely on a transparent or semi-transparent material there will be a deviation from a greater quantity of light to a lesser quantity of light and this deviation can also be used to effectuate controls.

Although the above techniques may be employed in many industries, they find important applications in the fabric knitting and weaving arts. Heretofore, imperfections were sensed by the use of contact feelers. However, such feelers which generally rub against the fabric often snag the material. When piled, patterned or looped materials have to be examined the problem is aggravated to the point of precluding the use of contact feelers.

There have been attempts to employ photo-electric techniques to detect imperfections. These techniques have in general been concerned with scanning the fabric with a sweeping beam of light which is reflected off the material and received by a photo-electric cell. Such techniques generally require complicated optical and mechanical systems which only have limited use. In these systems, for example, it is not possible to simultaneously sense an entire transverse area of a surface of material which is moving in a given direction. To overcome this difficulty, it is possible to use a bank of conventional photo-electric cells and a light source with the material moving between them. However, since the photo-electric cells can only sense discrete areas, optical systems have been devised which increase the lateral sensitivity of the photo-electric cells. However, such systems would be prohibitively expensive since the number of photo-electric cells required is extremely great and the optical systems are very complicated.

Furthermore, these systems can at best be used for sheet configurations of fabrics and have heretofore not been employed for tubular materials or fabrics which introduce in addition to the problems mentioned above an entirely new set of problems concerning space limitations and the inability to position the apparatus near the point of creation of the fabric.

It is accordingly a general object of the invention to provide improved apparatus for detecting imperfections in a material by examining the light transmission characteristics of the material.

It is another object of the invention to provide improved means for sensing the light transmission characteristics of large surfaces of knitted or woven materials which require neither complicated optical systems nor complex mechanical scanning devices.

It is a further object of the invention to provide means for detecting imperfections in a tubular material.

It is a still further object of the invention to provide means for sensing the light transmission characteristics of tubular surfaces of materials by photo-electric techniques.

It is yet another object of the invention to provide improved apparatus for detecting imperfections, by photo-electric techniques, in circularly woven or knitted fabrics.

It is another general object of the invention to satisfy the above objects by apparatus which is, on the one hand, extremely reliable and, on the other hand, is simple and inexpensive.

Briefly, in accordance with the invention, apparatus is provided for examining a surface of material being moved in a given direction comprising a source of light positioned on one side of the surface of material and a linear photo-sensitive means disposed on the other side of the surface of material to sense the light transmitted from the source of light via the surface of material. The linear photo-sensitive means, in general, extends across substantially the entire dimension of the material transverse to the given direction of motion. Means may be provided which is responsive to the photo-sensitive means to perform a control function.

Other objects, features and advantages of the invention will be apparent from the following detailed description when read with the accompanying drawing wherein:

FIGURE 5 shows the apparatus invention incorporated in a knitting machine.

Figure 1:
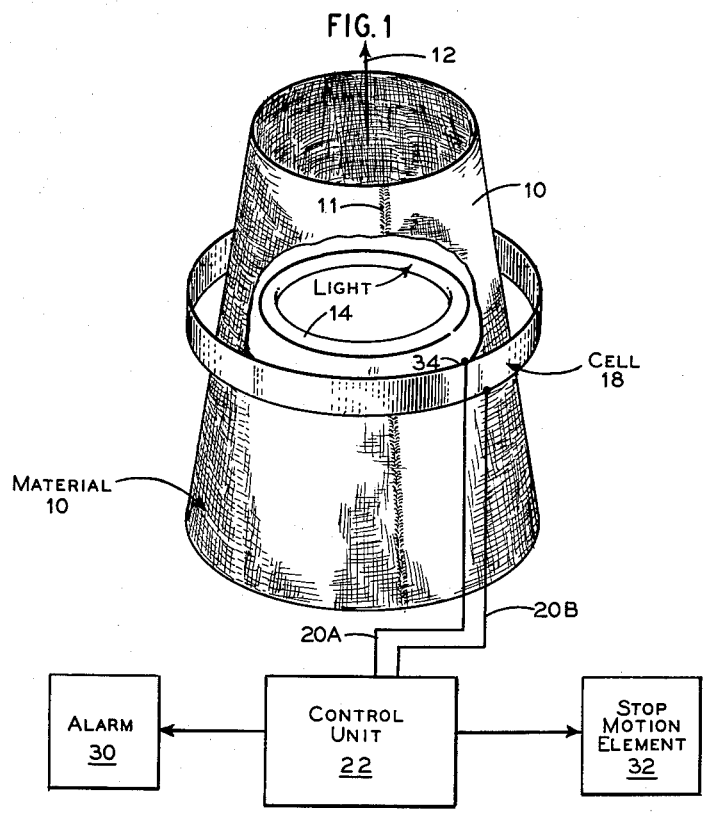
FIGURE 1 is a schematic diagram, partially in perspective, of apparatus for sensing imperfections in a tubular surface of material in accordance with an embodiment of the invention which employs a linear photo-sensitive means and a source of light.

Referring to FIGURES 1 and 5, there is shown in accordance with a preferred embodiment of the invention, apparatus for detecting imperfections in a tubular knitted fabric. In general, the material is knitted on a conventional circular knitting machine 100 which forms the threads into a continuous tube. Disposed along the path of travel of the material between the circular knitting elements and the take-up apparatus is the apparatus for examining the material.

More particularly, the tubular surface of fabric 10, a portion of which is shown partially broken away, is moving in a direction parallel to the axis 12 from the circular knitting elements 102 toward the take-up apparatus 104. Disposed within the tubular surface of fabric 10 is a source of light 14 connected to a source of electrical energy (not shown). Source of light 14 is shown as a linear continuous source, such as a neon tube, having a contour similar to the cross-section of the tubular surface of fabric 10. However, source of light 14 may be a conventional bulb or a rotating source as is hereinafter described.

Figure 2:
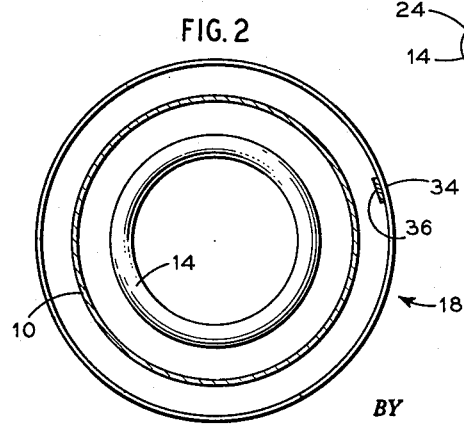
FIGURE 2 is an idealized cross-sectional view of FIGURE 1 showing the relative positions of the tubular material, the source of light and the linear photo-sensitive means.

As shown in FIGURE 2, this contour is a circle substantially concentric with the circular cross-section of the tubular surface of fabric 10. In any event, the source of light 14 when a circular source is used should be positioned suitably close to the tubular surface of material so that the internal surface of the tubular surface of fabric 10 is well illuminated. Thus, as the tubular surface of fabric 10 moves in the axial direction, its internal surface is continually illuminated.

Radially displaced on the other side of the tubular surface of fabric 10 is photo-sensitive means 18 has a contour substantially similar to the cross-section of the tubular surface of fabric 10. Photo-sensitive means 18 is disposed, preferably, in concentric coplanar relation with source of light 14. Photo-sensitive means 18 is a flat band of a semiconductor-photovoltaic material having the property of generating a voltage when light falls on a surface of the band. Leads 20a and 20b couple the photo-sensitive means 18 to a control unit 22 where the generated voltage is amplified. The gain of the amplifier in control unit 22 is provided with a threshold control to control the level at which control unit 22 will operate.

In circular knitting operations, the prime reason causing the changes in intensity of the received light is from imperfections in the knitted material. It is necessary to immediately detect an imperfection and stop the circular knitting machine. Thus, signals from control unit 22 may be transmitted to an alarm 30 and a stop motion element 32 which immediately stops the circular knitting machine when the imperfection is indicated by the sensing of the change in the intensity of the light received by the photo-sensitive means 18.

In some circular knitting operations the tubular surface of fabric 10 is purposely not uniform. For example, there are patterned and striping knitting operations where the tubular material contains an axial area of imperfections. Thus, a circumferential band of the tubular surface of fabric 10 will not uniformly transmit light. To prevent the control unit 22 from operating continuously these axial areas may be compensated for. For example, assume that the axial area 11 of the tubular surface of fabric 10 opposite the portion 34 of photo-sensitive means 18 is a section which contains such imperfections. The section may be compensated for by placing mask 36 over the appropriate portion of the photo-sensitive means 18.

Figure 3:
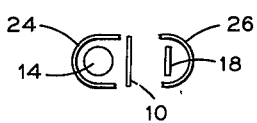
FIGURE 3 shows the cross-sectional view in a plane including the axis of the tubular surface of material of another embodiment of the invention incorporating hoods for the source of light and the photo-sensitive means.

FIGURE 3 shows an idealized cross-sectional view in a plane which includes the axis 12 of the tubular surface of fabric 10 in accordance with another embodiment of the invention. A reflective hood 24 encompasses the source of light 14 except the portion facing the tubular surface of fabric 10 for more efficiently illuminating a circumferential band. A hood 26 also encompasses the photo-sensitive means 18 except for the portion facing the tubular surface of fabric 10. Accordingly, the sensitivity of the apparatus is increased and the possibility of spurious light giving false indications is minimized.

Figure 4:
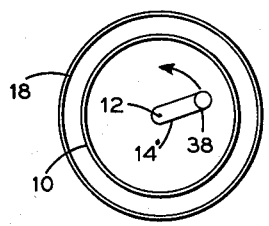
FIGURE 4 shows an alternate embodiment employing a rotating source of light.

FIGURE 4 shows an alternate embodiment of the invention wherein the rotating source of light 14' projects a moving beam of light. A lamp is disposed in an optical projection system 38 to form a narrow beam of light that is directed toward the band of fabric which is opposite the photo-sensitive means 18. Since the beam of light may be made very narrow by the use of a slit mask or diaphragm in the optical projection system 38 it is possible to obtain sharp resolution when portions of the photo-sensitive means 18 are masked by an element such as mask 36 of FIGURE 2. It should be noted that when the slit mask forms a beam having appreciable length, it is possible to examine the circumferential band several times before it moves past the photo-sensitive means 18 to insure that none of the fabric escapes examination.

Since the slit may be very narrow, excellent circumferential resolution is obtained. Quite often in circular knitting operations a rib in the tube of material parallel to its axis is purposely made thinner than the remainder of the tube of material to facilitate the later cutting open of the tube. If during such an operation photosensitive means 18 were uniformly sensitive such a rib would be equivalent to an imperfection. Therefore, to desensitize photosensitive means 18 to the detection of such a rib a masking means such as mask 36 of opaque material, as shown in FIGURE 2, is placed over that portion of photosensitive means 18 opposite which the rib travels while moving from the knitting machine.

Similarly, since the slit will have its long axis parallel to the axis of material 10 the same portion of material is scanned several times. For example, during the first revolution of source of light 14' said portion of material may be opposite the top of the slit; during a second revolution said portion may be opposite the center of the slit; and during a third revolution said portion may be opposite the bottom of the slit. Of course, the number of examinations is a function of the frequency of rotation of source of light 14' and the rate of downward travel of the tube of material 10. In this manner, reliability is enhanced.

There has thus been shown improved apparatus for examining materials and, particularly, tubular knitted material. The apparatus because it employs linear photo-sensitive means can reliably and inexpensively sense for imperfections in the surfaces of materials of unusually large dimensions without the use of complex and expensive optical and mechanical elements.

There will now be obvious to those skilled in the art many modifications and variations satisfying the objects and achieving many or all of the advantages but which do not depart from the spirit of the invention as defined in the following claims.

What is claimed is:

1. Apparatus for examining the light transmission characteristics in a tubular surface of material moving in a direction parallel to the axis of said tubular surface comprising a source of light disposed within said tubular surface of material for illuminating said tubular surface of material and an arcuated strip photo-sensitive means which is peripherally continuously disposed about said tubular surface, said photo-sensitive means being responsive to light transmitted through any portion of said tubular surface of material and means responsive to said arcuated strip photo-sensitive means for giving an indication when an imperfection is detected.

2. Apparatus for examining the light transmission characteristics of a tubular surface of material moving in a direction parallel to the axis of said tubular surface comprising a rotating source of light disposed within said tubular surface for projecting a beam of light in a plane perpendicular to said axis for illuminating a circumferential band of said material, a linear photo-sensitive means disposed on the other side of said tubular surface, said linear photo-sensitive means being in the form of a band having a contour substantially equal to the contour of said circumferential band and concentrically co-planer thereto and means responsive to said photo-sensitive means for giving an indication when an imperfection is detected.

3. Apparatus for examining for imperfections in a tube of fabric moving in a direction parallel to the axis of said tube while leaving a circular knitting machine comprising a source of light disposed within said tube of fabric for uniformly illuminating the interior of said tube, a linearly continuous strip like photo-sensitive means in the form of a band having constant sensitivity along its length disposed about the outside of said tube, said linearly continuous photo-sensitive means having a contour substantially equal to the contour of a circumferential band of said tube and concentrically co-planer thereto, and control means responsive to said linearly continuous photo-sensitive means for controlling the movement of said tube of fabric.

4. The apparatus of claim 3 including masking means for controlling the responsiveness of portions of said linearly continuous striplike photo-sensitive means.

5. The apparatus of claim 3 including a hood encompassing all of said linearly continuous striplike photo-sensitive means but the portion facing said tube of fabric.

6. The apparatus of claim 3 wherein said source of light is a linearly continuous closed tube concentrically coplanar with said linearly continuous photo-sensitive means and including a reflective hood encompassing all of said source of light but the portion facing said tube of fabric.

7. Apparatus for examining the light transmission characteristics of a tube of material moved in a given direction comprising a source of light disposed within said tube of material, a closed strip of photo-sensitive material having substantial uniform sensitivity along its length disposed about said tube of material, and means responsive to said strip for giving an indication when an imperfection is sensed.

8. Apparatus for examining the light transmission characteristics of a tube of material being moved in given direction comprising a linearly continuous source of light disposed within said tube of material, a linearly continuous strip of photo-sensitive material which has a uniformly continuous sensitivity disposed about said tube of material, said linear photo-sensitive means being substantially parallel to said linearly continuous source of light and means responsive to said strip for giving an indication when an imperfection is sensed.

9. Apparatus for examining the light transmission characteristics of a tubular surface of material moving in a direction parallel to the axis of said tubular surface comprising a source of light within said tubular surface for uniformly illuminating a circumferential band of said tubular surface, a striplike photo-sensitive means disposed about said tubular surface and forming a substantially continuous closed curve having a contour substantially equal to the contour of said circumferential band, and means responsive to said photo-sensitive means for giving an indication when an imperfection is detected.

10. The apparatus of claim 9 wherein said source of light is in the form of a substantially continuous closed curve having a contour substantially equal to the contour of said circumferential band; said source of light and said photo-sensitive means being concentrically coplanar to said circumferential band.

11. Apparatus for examining a tube of material comprising first means for illuminating a portion of said tube of material, said first means having a contour substantially equal to the contour of a circumferential band of said tube and substantially concentrically coplanar thereto, second means for uniformly sensing for the passage of light through said tube, said second means being a band of striplike photo-sensitive material having a contour substantially equal to the contour of said circumferential band and substantially concentrically coplanar thereto, one of said means being disposed within said tube, the other of said means being disposed about said tube, and means responsive to said photo-sensitive means for giving an indication when an imperfection is sensed.

12. Apparatus for examining an open tube of material comprising first means for uniformly illuminating a portion of said tube of material, said first means having a contour substantially equal to the contour of a circumferential band of said open tube and concentrically coplanar thereto, second means for uniformly sensing for the passage of light through said tube, said second means being a band of striplike photo-sensitive material having a contour substantially equal to the contour of said circumferential band and concentrically coplanar thereto, one of said means being disposed within said open tube, the other of said means being disposed about said open tube; and means responsive to said photo-sensitive means for giving an indication when an imperfection is sensed.

References Cited in the file of this patent
UNITED STATES PATENTS

| | | |
|---|---|---|
| 1,433,555 | Kolb | Oct. 31, 1922 |
| 2,290,257 | Stanley et al. | July 21, 1942 |
| 2,346,240 | Thomas | Apr. 11, 1944 |
| 2,421,092 | Thomas | May 27, 1947 |